United States Patent

Mintchev et al.

[11] Patent Number: 6,094,623
[45] Date of Patent: Jul. 25, 2000

[54] NON-LINEAR DIGITAL ADAPTIVE COMPENSATION IN NON-IDEAL NOISE ENVIRONMENTS

[75] Inventors: Martin Pavlov Mintchev, Calgary; Tyler Lee Brandon, Sherwood Park; Herbert Tabler, Edmonton, all of Canada

[73] Assignee: The Governors of the University of Alberta, Edmonton, Canada

[21] Appl. No.: 09/047,212

[22] Filed: Mar. 25, 1998

[51] Int. Cl.[7] .................................................. G06F 19/00
[52] U.S. Cl. .................. 702/85; 702/9; 702/17; 381/71.11; 381/71.12
[58] Field of Search ................... 702/85, 9, 17; 381/71.11, 71.12, 94.7; 708/322

[56] References Cited

U.S. PATENT DOCUMENTS

| | | |
|---|---|---|
| 4,964,087 | 10/1990 | Widrow ........................................ 702/17 |
| 5,126,681 | 6/1992 | Ziegler, Jr. et al. .................... 381/94.7 |
| 5,209,237 | 5/1993 | Rosenthal ................................. 708/322 |
| 5,272,680 | 12/1993 | Stone et al. . |
| 5,490,121 | 2/1996 | Gardiner . |
| 5,577,127 | 11/1996 | Van Overbeek ..................... 381/71.11 |
| 5,740,256 | 4/1998 | Castello Da Costa et al. ....... 381/94.7 |

*Primary Examiner*—Marc S. Hoff
*Assistant Examiner*—Bryan Bui
*Attorney, Agent, or Firm*—C. A. Rowley

[57] ABSTRACT

An adaptive system applicable to non-ideal measurement operations wherein the reference signal includes information attempting to be extracted from the primary signal and wherein digital non-linear manipulation is applied to the signal to noise ratio in the reference signal.

12 Claims, 9 Drawing Sheets

NON-LINEAR DIGITAL ADAPTIVE COMPENSATION IN NON-IDEAL NOISE ENVIRONMENTS

FIELD OF THE INVENTION

The present invention relates to an improved method of adaptive compensation in measurement systems, more particularly the present invention relates to an improved adaptive compensation method suitable for use in non-ideal applications

BACKGROUND OF THE INVENTION

The principles of adaptive noise compensation have been described by in Widrow B., Glover J. R., McCool J. M., Kaunitz J., Williams C. S., Heam R. H., Zeidler J. R., Dong jr. E., Goodlin R. C. Adaptive noise cancellation: principles and applications. Proc. IEEE, 63: 1692–1716, 1975. And incorporated herein by reference. This principal with multiple modifications and improvements have been widely used in a variety of applications.

The adaptive process consists of dynamically manipulating the vector of weighting factors W so that the expected value of the output signal c is minimized. This minimization process is often done using the Widrow-Hoff Least Mean Square (LMS) algorithm as described in the Windrow et al. publication identified above and in Chen J., Vanderwalle J., Sansen W., Vantrappen G., Janssens J. Adaptive method for cancellation of respiratory artifact in electrogastric measurements. Med. & Biol. Eng. & Comput, 27: 57–63, 1989 incorporated herein by reference.

Generally the primary signal is viewed as a summation of two signals, an information signal s1(t) and a noise signal n1(t). The secondary or reference signal consists of a noise signal n2(t) that is related to the noise component n1(t) in the primary signal. It is important to recognize that the two noise signals can differ in both phase and amplitude, but are considered strongly correlated. A compensation signal x(t) which under ideal conditions should be equal to the noise n1(t) is obtained through a combination of the reference signal, the output signal c(t) and the weighting factors w(t). Thus, by subtracting the compensation signal x(t) from the primary signal only the information signal s1(t) remains.

It is known that the adjustment of n2(t) for an optimal x(t) can be achieved by minimizing the energy of the output signal c(t) which is the difference between the primary (s1+n1) signal and the compensation signal x(t), thus:

$$c = s1 + n1 - x \quad [1]$$

After squaring equation [1]:

$$c^2 = s1^2 + 2s1(n1-x) + (n1-x)^2 \quad [2]$$

one can subsequently calculate the expected value of the result (2):

$$E[c^2] = E[s1^2] + E[(n1-x)^2] + 2E[s1(n1-x)] \quad [3]$$

Keeping in mind that E[s1.n1] and E[s1.x] correspond to the crosscorrelation between non-correlated signals:

$$2E[s1(n1-x)] = 0 \quad [4]$$

Thus, equation [3] now becomes:

$$E[c^2] = E[s1^2] + E[(n1-x)^2] \quad [5]$$

The goal of the adaptive compensation process is to minimize the second term of equation [5]:

$$\min E[c^2] = E[s1^2] + \min E[(n1-x)^2] \quad [6]$$

Equation [6] represents the essence of Widrow-Hoff Least Mean Square (LMS) algorithm described in the Widrow et al. publication described above.

The minimal number of the weighting factors can be expressed with (10):

$$M = f_{max}/f_{min} \quad [7]$$

where $f_{max}$ and $f_{min}$ are the frequencies of the maximal and minimal frequency components contained in the primary signal. However, it has been shown previously that this number should also be greater than $2f_{max}$ see Sadasivan P. K. and Dutt D. N. A non-linear estimation model for adaptive minimization of EOG artifact from EEG signals. Int. J. on Bio-Medical Computing, 36:199–207, 1994. In the digital equivalent of adaptive filtering setup, all signals are usually presented with capital letters. The number of stored samples of the reference signal N2 and the number of weighting factors M is the same. The compensation signal X(j) is calculated as follows:

$$X_j = \sum_{k=j-(M-1)}^{j} N2_k W_{(j-k)j} \quad [8]$$

where j is the current sample, M is the number of weighting factors, $N2_k$ is the noise value after n samples, and W is the value of a given weighting factor.

For each new sample the weighting factors are recalculated based on their previous values, the reference signal N2 and its previous values, the output C and the feedback parameter $\mu$. Using Widrow-Hoff's LMS algorithm the weighting factors can be determined with:

$$W_{ij+1} = W_{ij} + 2\mu N2_{j-i} C_j \quad [9]$$

where i ranges from j to j–M, j is the current sample, and $W_{ij}$ is the value of the i-th weighting factor in the j-th sample. By varying the feedback parameter $\mu$ the convergence speed and the accuracy of the adaptive filter can be manipulated. By setting $\mu$ higher the convergence speed is increased but accuracy lost (1, 2). Setting $\mu$ lower increases accuracy but slows convergence speed. The algorithm will remain stable if $\mu$ is maintained within the range:

$$0 < \mu < 1 \bigg/ \left( \sum_{i=0}^{M-1} N2_{j-i}^2 \right) \quad [10]$$

The adaptive system as described above is very effective for a variety of different applications, however it is not very effective when applied in non-ideal noise environments, which significantly limits the application to which the adaptive system may be applied.

Adaptive compensation based on the described Widrow-Hoff LMS algorithm provides reliable results only if two important conditions are met:

(1) the reference channel does not contain any information signal, and (2) the noise in the reference channel is strongly correlated with the noise in the primary channel.

In many real-life applications these two conditions are mutually contradictive—in order to provide the strongest possible correlation between the noise in the reference and in the primary channels the latter should be obtained from one and the same location. This, however, implies that the reference channel would contain also 100% of the information signal. At the other end of the scale, if the reference channel is obtained from a very remote location with respect to the primary channel so that the content of primary signal in the former is negligible (0%), the risk of reduction of the correlation relationship between the noises n1 and n2 increases significantly.

Kentie M. A., Van Der Schee E. J., Grashuis J. L., Smout A. J. P. M., (1981) Adaptive filtering of canine electrogastrographic signals. Part 1: system design. Med.& Biol. Eng. & Comput., 19, 759–764.(7) suggested a simple solution to this problem by modifying the adaptive compensator and deriving the reference from the primary channel. They were able to show better performance of the modified adaptive compensator as compared to an alternative bandpass filter with reversed frequency band and similar slope as the rejective filter used in the design. The improvement in the performance could be related to the reduction of the signal-to-noise ratio in the reference channel which possibly reduced the percentage of information signal in it. This method for adaptive filtering of information signals with broader frequency spectra makes it difficult, if not impossible to find an appropriate rejective filter to eliminate a significant number of frequency components related to the information signal alone which limits the applications of this.

Another suggested solution is to replace the noise in the reference channel with an artificially synthesized signal obtained with non-linear estimation using computer modeling as described in the hereinabove identified Sadasivan et al reference. This is difficult to do with acceptable accuracy particularly in environments with dynamic noise artifacts.

Under non-ideal applications where the information signal is present in the reference signal the adaptive filtering process will attempt to eliminate it in the primary signal, potentially resulting in distortions and/or decay of the output signal. The adaptive compensation technique applied in these circumstances would attempt to minimize the primary signal's data component.

None of the suggested solutions have proven to be effective for most non-ideal applications of adaptive compensation.

BRIEF DESCRIPTION OF THE PRESENT INVENTION

It is the main object of the present invention to provide an adaptive filtering system for use in non-ideal applications wherein the reference signal includes an information signal derived from the transmitted signal.

It is a further object of the present invention to provided a general adaptive filtering system suitable for use in biomedical applications.

It is another object of the present invention to provide an adaptive filtering system for use in Measurement While Drilling (MWD) applications.

Broadly the present invention relates to a method of applying adaptive filtering in non-ideal noise environments comprising sending an output signal C, collecting a primary signal P containing an information signal component S1 representing said output signal C and a first noise signal N1, collecting a reference signal R containing a second noise signal N2 and a second information signal S2 representative of said output signal c in said reference signal R, generating a compensation signal X based on said reference signal R, said output signal C and weighting factors W, said compensation signal X being derived using a first equation $$X = N3 + S3$$

where;

N3=a manipulated input derived from the error component N2 in reference signal R, and S3 is a manipulated input derived from the information component S2 of the reference signal R and subtracting X from said primary signal P to generate a corrected said output signal C based on a second equation $$C = S1 + N1 - X$$

taking the exception of a third equation derived from said second equation to provide a fourth equation which is minimized for adaptive compensation to provide a fifth equation $$min\ E[C^2] = min\ E[(S1-S3)^2] + min\ E[(N1-N3)^2]$$

minimizing the values of $$N3 + S3 = (N2 + S2) \cdot e^{(a+b|N2+S2|/d)}$$

selecting values for a, b and d by computer modeling for information and noise signal components S1 and N1 of said primary signal N2 in said reference signal R while controlling iterative adjustments using quantitative analysis of cross correlation coefficients between corresponding intervals of said output signal in an ideal noise environment and said output signal in the non-ideal noise environment after convergence time had elapsed.

Preferably, said modeling comprises selecting a first signal of a first form mixed with a second signal of a second form, selecting values for d and b and iteratively deriving a value for a.

Preferably d will be selected as value of between 250 and 1500 and b will be −1 or +1, and in sever non-ideal environments d preferably will be between 250 to 500.

Preferably said primary signal and reference signal will based on measurements by sensors at different locations in a mud pumping system of a measurement while drilling signal operation.

Preferably said primary and reference signal will be based on measurement in a biomedical information system.

BRIEF DESCRIPTION OF THE DRAWINGS

Further features, objects and advantageous will be obvious from the following detailed description of the present invention taken in conjunction with the accompanying drawings in which:

FIG. 11 are plots of input and output signals wherein;

A is a plot of the data or output signal;

B is the reference signal with no non-linear gain;

C is the information signal before non linear gain;

D is the reference channel with non-linear gain applied; and

E is the information signal generated after non-linear manipulation of the reference signal.

DESCRIPTION OF THE PREFERRED EMBODIMENTS

The normal or standard adaptive technique as above described is suitable for some applications, but is not particularly effective for non-ideal applications wherein the reference signal R includes a significant component derived from the input signal C that the system is attempting to decipher from the measured or monitored primary signal P containing as above described an information signal S1 and a noise signal N1.

Figure 1:
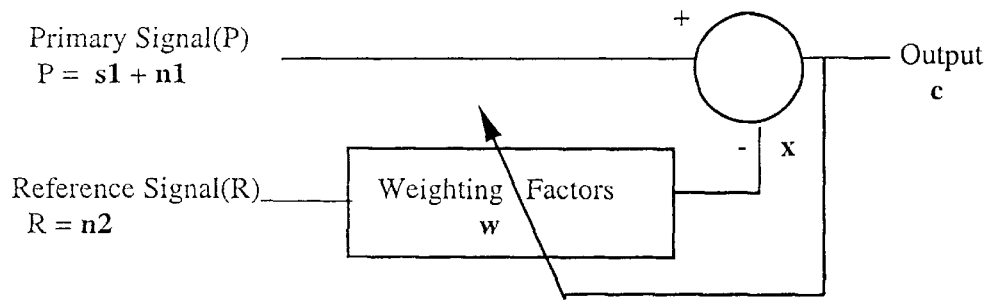
FIG. 1 is a block-diagram of the traditional adaptive compensation setup.
Figure 2:
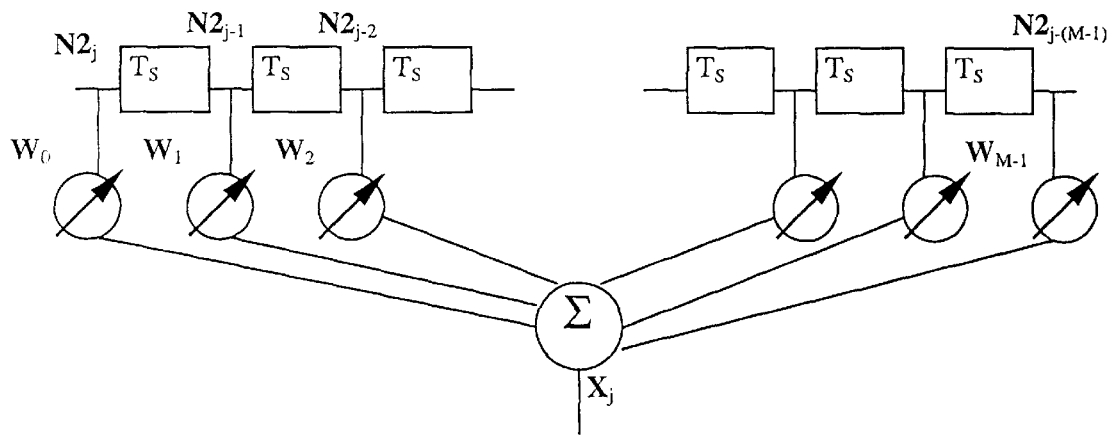
FIG. 2 is a digital representation of the traditional adaptive compensation process.

A typical analogue adaptive system is represented in FIG. 1 wherein the output signal is being derived from the primary signal p by subtracting of a compensating signal x derived from the reference signal r by applying weighting factors w. The digital equivalent of the block-diagram from FIG. 1 is shown in FIG. 2. Since the adaptive compensation system is digitized, capital letters are used below to denote signals. At the discrete moment j the compensation signal X(j) is a combination of weighting factors W(j), the current and previous values of the reference signal N2(j), and the current output signal C(j). As above described by continually adjusting the weighting factors over time the compensation signal X(j) will progress towards the noise signal N1(j) (the noise signal contained within the primary signal).

The minimal number of the weighting factors as above described can be expressed with:

$$M = f_{max}/f_{min} \quad [7]$$

where $f_{max}$ and $f_{min}$ are the frequencies of the maximal and minimal frequency components contained in the primary signal. However, this number should also be greater than $2f_{max}$. The number of stored samples of the reference signal N2 and the number of weighting factors M is the same. The compensation signal X(j) is calculated as follows:

$$X_j = \sum_{k=j-(M-1)}^{j} N2_k W_{(j-k)j} \quad [8]$$

where j is the current sample, M is the number of weighting factors, $N2_k$ is the noise value after n samples, and W is the value of a given weighting factor.

Figure 3:
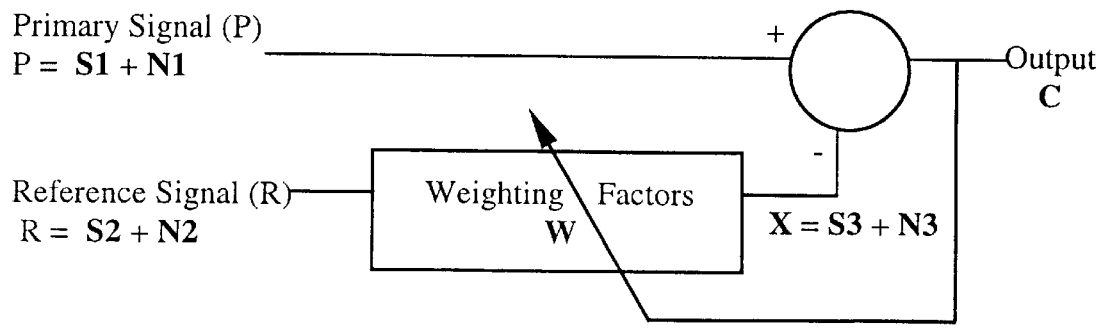
FIG. 3 is a schematic block diagram of the adaptive compensation system of the present invention applied to a non-ideal noise environment.

To apply the present invention as schematically represented in the block diagram of FIG. 3 equation [1] above is rewritten using digital signals at the j-th sampling instant:

$$C_j = S1_j + N1_j - X_j \quad [11]$$

In all derivations below j-th sampling instant are assumed, but the actual index will be omitted for the sake of simplicity in the following description.

Given that X in the present invention consists of the manipulated inputs S2 and N2 represented as S3 and N3 respectively, it can be written:

$$X = N3 + S3 \quad [12]$$

Substituting equation [12] into equation [11]:

$$C = S1 + N1 - (N3 + S3) \quad [13]$$

Rewriting equation [13]:

$$C = (S1 - S3) + (N1 - N3) \quad [14]$$

Squaring gives:

$$C^2 = (S1-S3)^2 + 2(S1-S3)(N1-N3) + (N1-N3)^2 \quad [15]$$

Now taking the expectation of equation [15]:

$$E[C^2] = E[(S1-S3)^2] + 2E[(S1-S3)(N1-N3)] + E[(N1-N3)^2] \quad [16]$$

Noting that $$E[(S1-S3)(N1-N3)] = 0 \quad [17]$$

equation [16] can be rewritten:

$$E[C^2] = E[(S1-S3)^2] + E[(N1-N3)^2] \quad [18]$$

Adaptive compensation seeks to minimize equation [18]:

$$min\ E[C^2] = min\ E[(S1-S3)^2] + min\ E[(N1-N3)^2] \quad [19]$$

Equation [19] differs substantially from equation [6] because the component containing the information signal is now also a subject of minimization. Practically this means that the output of the adaptive compensator would be distorted and its reliability would be jeopardized depending on the magnitude of S3. Naturally, an appropriate solution for an adaptive compensator in a non-ideal noise environment would be the minimization of S3, which is equivalent to the minimization of the information signal component (or to the reduction of the signal-to-noise ratio) in the reference signal or channel R.

Figure 4:
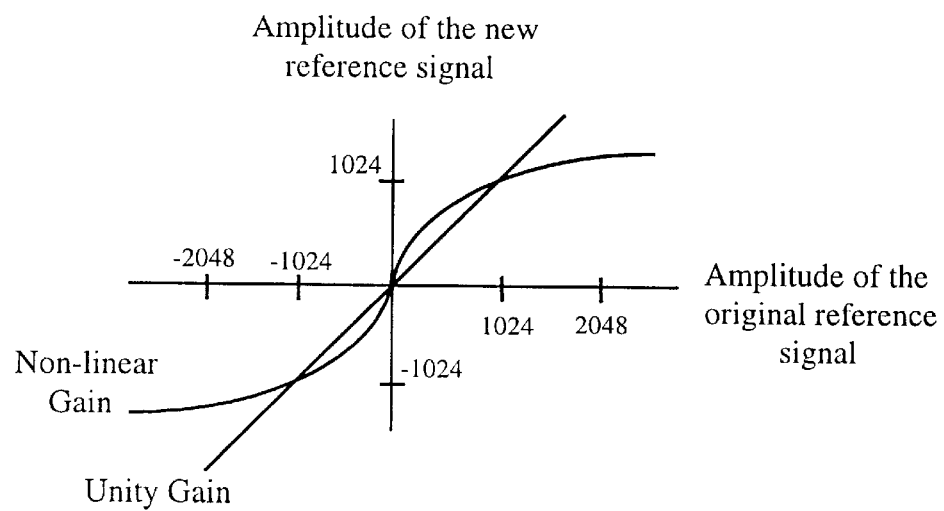
FIG. 4 schematically illustrates the concept of real-time non-linear manipulation of the reference signal as swings of the unity gain in the reference channel.

Real-time manipulations of the signals in the reference channel R can be easily implemented using non-linear digital gain of exponential type illustrated graphically FIG. 4. The method could be thought of as making the line of the unity gain swing in different but controllable directions:

$$N3 + S3 = (N2 + S2) \cdot e^{(a+b|n2+s2|)/d} \quad [20]$$

Obviously, these non-linear changes of the reference signal could reduce or increase the signal-to-noise ratio in an uncontrollable way. It is of primary importance, therefore, to choose appropriate values for the parameters a, b and d, and to control their adjustment for optimal performance.

Two problems need to be addressed to quantitatively evaluate the performance:

(1) what should be the initial values of the non-linear parameters; and (2) how can one determine that the direction of iterative change of a given parameter is appropriate.

We solve these two problems using computer models for the information signal and the noise in both primary and reference channels or signals P and R respectively of the adaptive compensator. Control over the iterative adjustment of the non-linear parameters is achieved using quantitative evaluation of the cross correlation coefficient between corresponding intervals of the output signal in an ideal noise environment and the output signal in the non-ideal noise environment after the convergence time had elapsed. The choice of an adequate computer model becomes important for the optimal performance of the non-linear adaptive compensator in real-life conditions.

It has been found that if the information signal is of broad frequency spectrum (i.e. digital signal), while the noise is close to a sine wave (or has a narrow frequency spectrum) a value for parameter b of −1 is effective as it makes greater amplitudes in the reference channel compressible, which is beneficial. On the other hand when there is broad spectrum noise present with a narrower spectrum information signal a value for b of +1 would be applicable.

A good starting point for the optimization process is to choose a large value for parameter d i.e. above about 500, or in other words making the swings of the unity gain line (see FIG. 4) very marginal, thus setting conservatively the transfer function of the non-linear multiplier in the neighborhood of unity gain. Typically in environments that are approaching i.e. are close to ideal d may be as high as 1,000 to 1,500 while in severely non-ideal environments d would be less than 500 and could be as low as about 250.

The invention will now be described in more detail in two significantly different applications.

First Application

A typical application is to a biomedical information signal mixed with noise as is found in many biomedical applications.

A model of a broader-spectrum biomedical information signal in narrow-spectrum noise environment is a typical example of the benefits of the non-linear adaptive compensator of the present invention.

Figure 5:
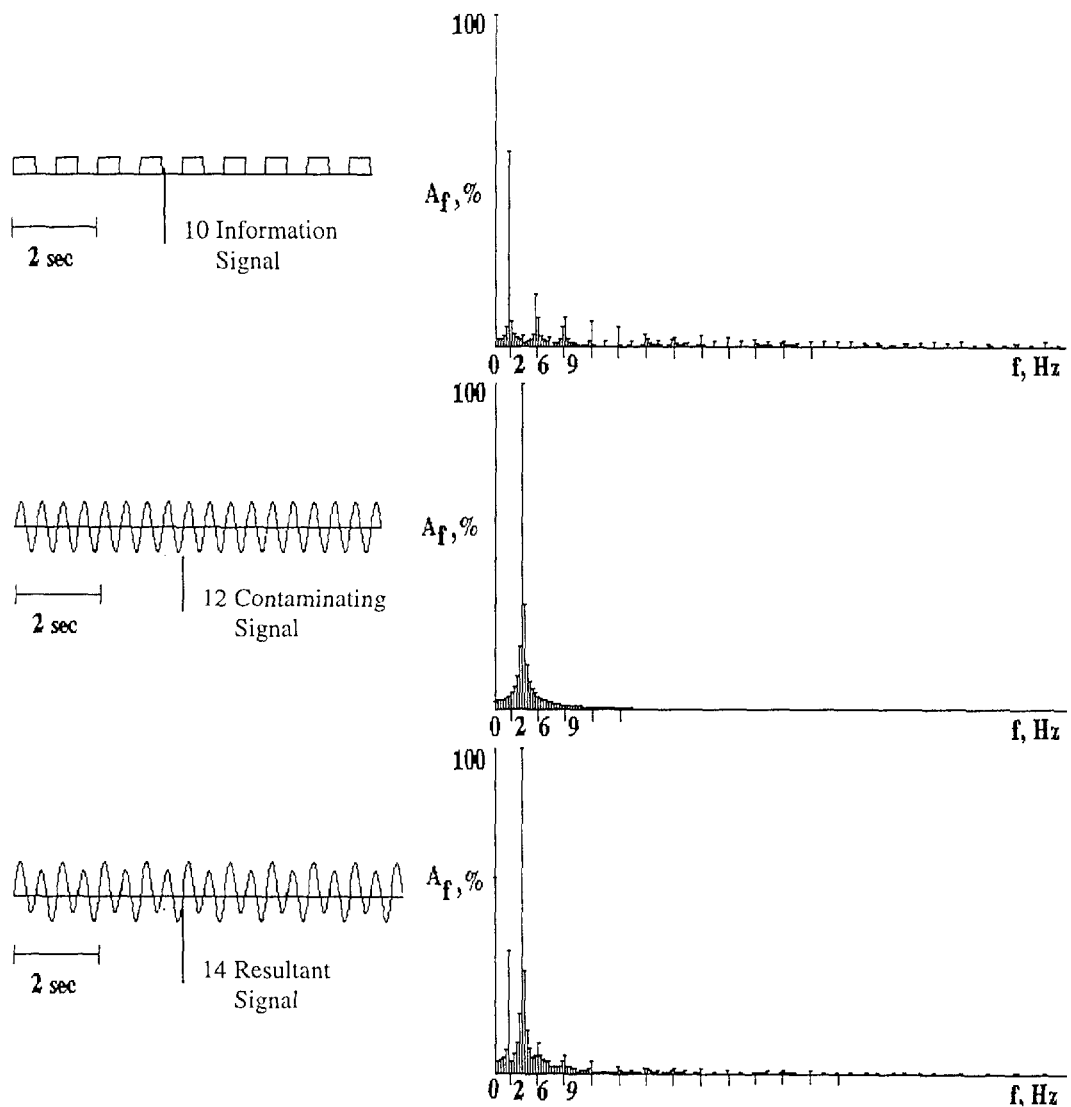
FIG. 5 shows plots of model wherein the information signal was a 2-Hz monopolar rectangular pulses (above, left), the information signal was contaminated with 4-Hz sinusoidal noise (middle, left) with the resulting mixed signal shown at the bottom (left). The respective frequency spectra of the information signal, the noise and their mixture are shown (right).

This model as illustrated in FIG. 5 utilized a 2 Hz monopolar rectangular signal 10 (see FIG. 5 top left) mixed with a 4 Hz sine wave noise 12 (middle) both sampled at 200 Hz to provide a resultant signal 14. This setup covers the majority of the relevant biomedical applications since the information signal is of very broad spectrum, and in addition is DC-shifted, while the noise is within a very specific narrow frequency spectrum which is mixed with the spectral components of the information signal.

Figure 6:
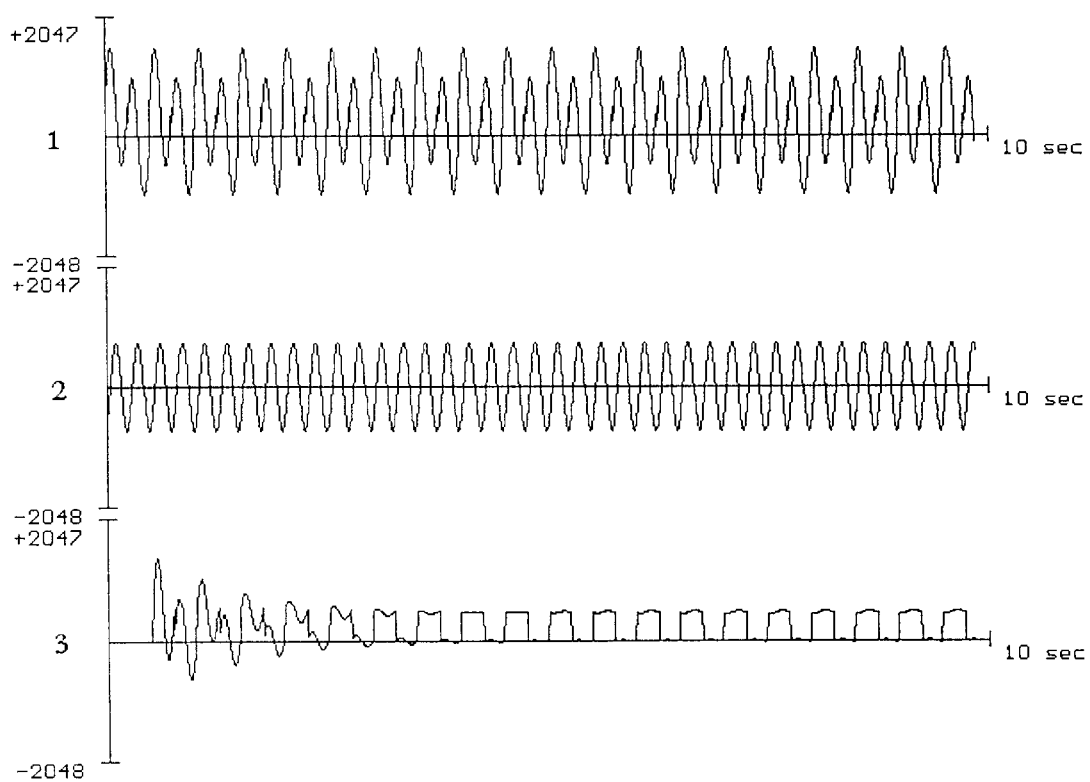
FIG. 6. is an example showing a contaminated information signal (Channel 1) and pure sinusoidal noise (Channel 2) subjected to the traditional adaptive LMS algorithm and the original rectangular signal extracted after a minimal convergence time (Channel 3).

FIG. 6 shows the work of the adaptive compensator in an ideal noise environment in the reference channel 2 comprising of a 4-Hz sine wave shifted with respect to the sine wave noise in the primary channel by 60 degrees. After a minimal convergence time the adaptive compensator was able to clearly extract the digital signal (Channel 3) although the first frequency harmonic of the latter coincided with the major frequency component of the noise (see FIG. 5).

Figure 7A:
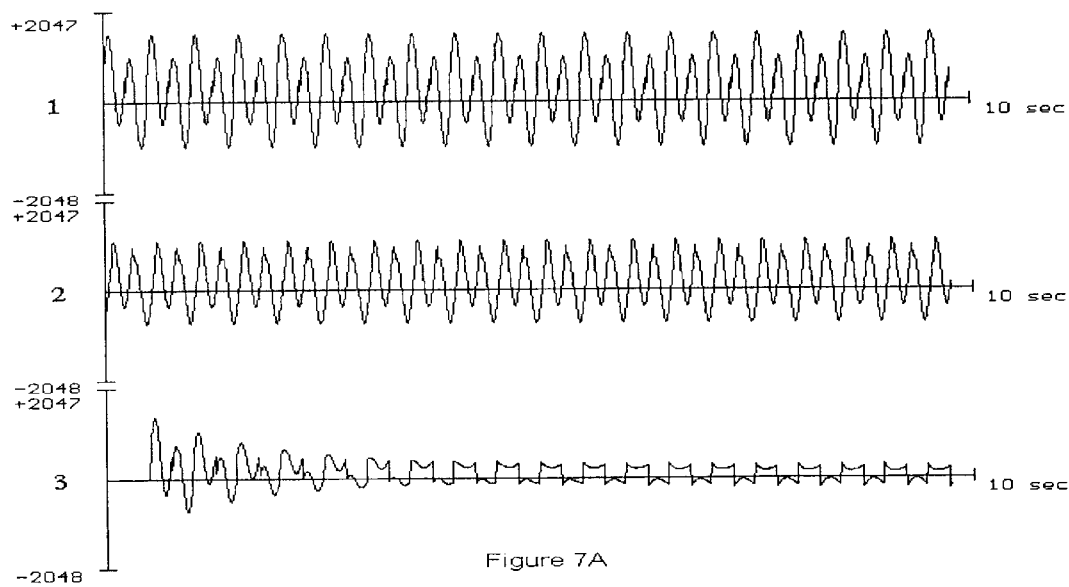
FIG. 7A is a plot of a Primary channel comprised of a contaminated information signal (Channel 1); of a reference channel comprised of sinusoidal noise mixed with information signal (Channel 2); and a plot of a the application of a traditional adaptive algorithm, showing the inadequate waveform of the filtered signal and its persistent deterioration (Channel 3).
Figure 7B:
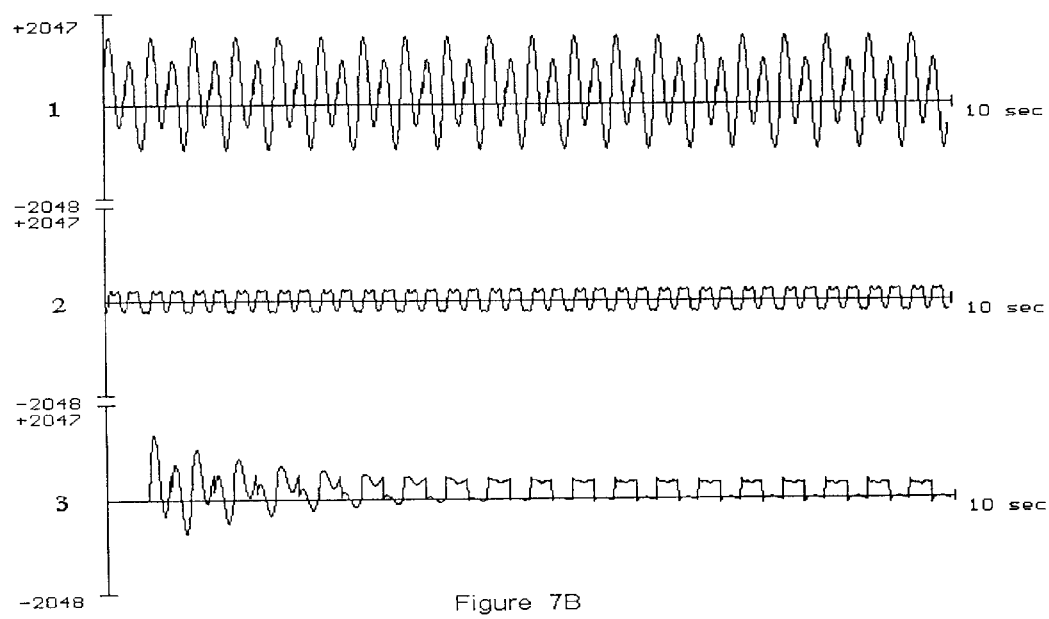
FIG. 7B are plots similar to those of FIG. 7A showing the improvement of the waveform of the filtered signal and slowing deterioration of the signal amplitude as obtained when applying the present invention (Channel 3).

In FIG. 7-A a realistic model of a non-ideal noise environment in the reference channel is presented—the phase-shifted sine wave noise in Channel 2 (FIG. 7B) is mixed with phase-shifted information signal (60 degrees phase shift in both channels). The amplitude of the information signal in the reference channel is 75% of the amplitude of the information signal in the primary channel. The deterioration in the performance of the adaptive compensator is clearly evident (Channel 3). The correlation coefficient between 10-second interval from the model in the ideal noise environment (Channel 3, FIG. 6) and the corresponding 10-second interval from the output signal in non-ideal noise environment (channel 3, FIG. 7-A) was 0.57 immediately after the convergence time and deteriorated further to 0.35 after 50 seconds (Table 1).

TABLE 1

Deterioration of the crosscorrelation coefficient between adaptively filtered 2 Hz rectangular signal in non-ideal noise environment and a model 2 Hz rectangular signal. The starting second 0 was immediately after the end of the convergence time.

| | 0–10 seconds | 10–20 seconds | 20–30 seconds | 30–40 seconds | 40–50 seconds |
|---|---|---|---|---|---|
| Crosscorrelation Coefficient | 0.57 | 0.50 | 0.44 | 0.39 | 0.35 |

The purpose of non-linear manipulation of the signal in the reference channel is to diminish the signal-to-noise ratio so that the impact of the parasite information signal on the adaptive process is minimal. The present invention provides a solution to this for application in non-ideal noise environments.

The problem is how to determine and optimize the parameters a, b and d from equation [20] so that the deterioration of the signal-to-noise ratio is quantifiable and controllable.

A good starting point for the optimization process is to choose a large value for parameter d i.e. above about 500, or in other words making the swings of the unity gain line (see FIG. 4) very marginal, thus setting conservatively the transfer function of the non-linear multiplier in the neighborhood of unity gain. Typically in environments that are approaching i.e. are close to ideal d may be as high as 1,000 to 1,500 while in severely non-ideal environments d would be less than 500 and could be as low as about 250.

Next, the value for parameter b is determined and it has been found that a value of −1 is effective as it makes greater amplitudes in the reference channel compressible, which is beneficial if the information signal is of broad frequency spectrum (i.e. digital signal), while the noise is close to a sine wave (or has a narrow frequency spectrum). On the other hand s above described when there is broad spectrum noise present with a narrower spectrum signal a value for b of +1 would be applicable.

Following this logic, a would remain the single adjustable parameter for crosscorrelation adjustment.

An example of the result of an iterative optimization of the non-linear multiplier in the reference channel using the above approach is shown on FIG. 7-B. Improvement in the waveshape of the rectangular signals in Channel 3 relative to Channel 3 of FIG. 7-A is clearly evident. The correlation coefficient between 10-second interval from the model in ideal noise environment and the corresponding interval in the non-linear setup was 0.79 immediately after the convergence time and deteriorated at much slower rate to 0.67 after 50 seconds (see Table 2). These results were obtained after 50 iterations with a=120, b=−1 and d=550.

TABLE 2

Crosscorrelation coefficient between adaptively filtered rectangular signal in non-ideal noise environment and a model rectangular signal when non-linear manipulation of the reference channel of the adaptive filter was utilized

| | 0–10 seconds | 10–20 seconds | 20–30 seconds | 30–40 seconds | 40–50 seconds |
|---|---|---|---|---|---|
| Crosscorrelation Coefficient | 0.79 | 0.76 | 0.72 | 0.69 | 0.67 |

Compared to the data from Table 1, stronger correlation and slower signal deterioration are clearly evident.

The present invention offers a quantitatively-controlled improvement in the performance of adaptive compensators in non-ideal noise environments by introducing a non-linear iteratively-controlled multiplier in the reference channel which differs substantially from the sigmoid-type of non-linear estimation suggested in Sadasivan P. K. and Dutt D. N. A non-linear estimation model for adaptive minimization of EOG artefact from EEG signals. Int. J. on Bio-Medical Computing, 36:199–207, 1994.

A low frequency digital signal was used as a model of an information signal in the environment of sinusoidal noise. The performance of the adaptive compensator was monitored quantitatively by the crosscorrelation between corresponding intervals of output signals in ideal and non-ideal noise environments.

Properly designed and iteratively controlled non-linear multiplier in the reference channel can substantially improve the performance of real-time adaptive compensators in non-ideal noise environments. This method can be applicable in a variety of biomedical engineering applications including e.g. electrocardiography, electroencephalography.

Second Application

The following will describe the application of the present invention to a second application significantly different from the first application discussed above, but wherein the principals of the present invention may be used to advantage, namely to perform Measurement While Drilling (MWD) operations. MWDs relay from downhole information, such as toolface angle, azimuth and pressure, to the surface while the drilling operation continues. One of the most common methods of passing the information from the downhole sensors to the surface is through pressure coded pulses in the mud flow. The MWD unit is located relatively close to the drill bit and transmits its information in an encoded form to a device that restricts the flow of mud in accordance with this information. Restricted mud flow causes increased pressure in the mud stream. These pressure variations travel the entire drill column to the surface where they are measured and then converted back into the original data from downhole.

Figure 8:
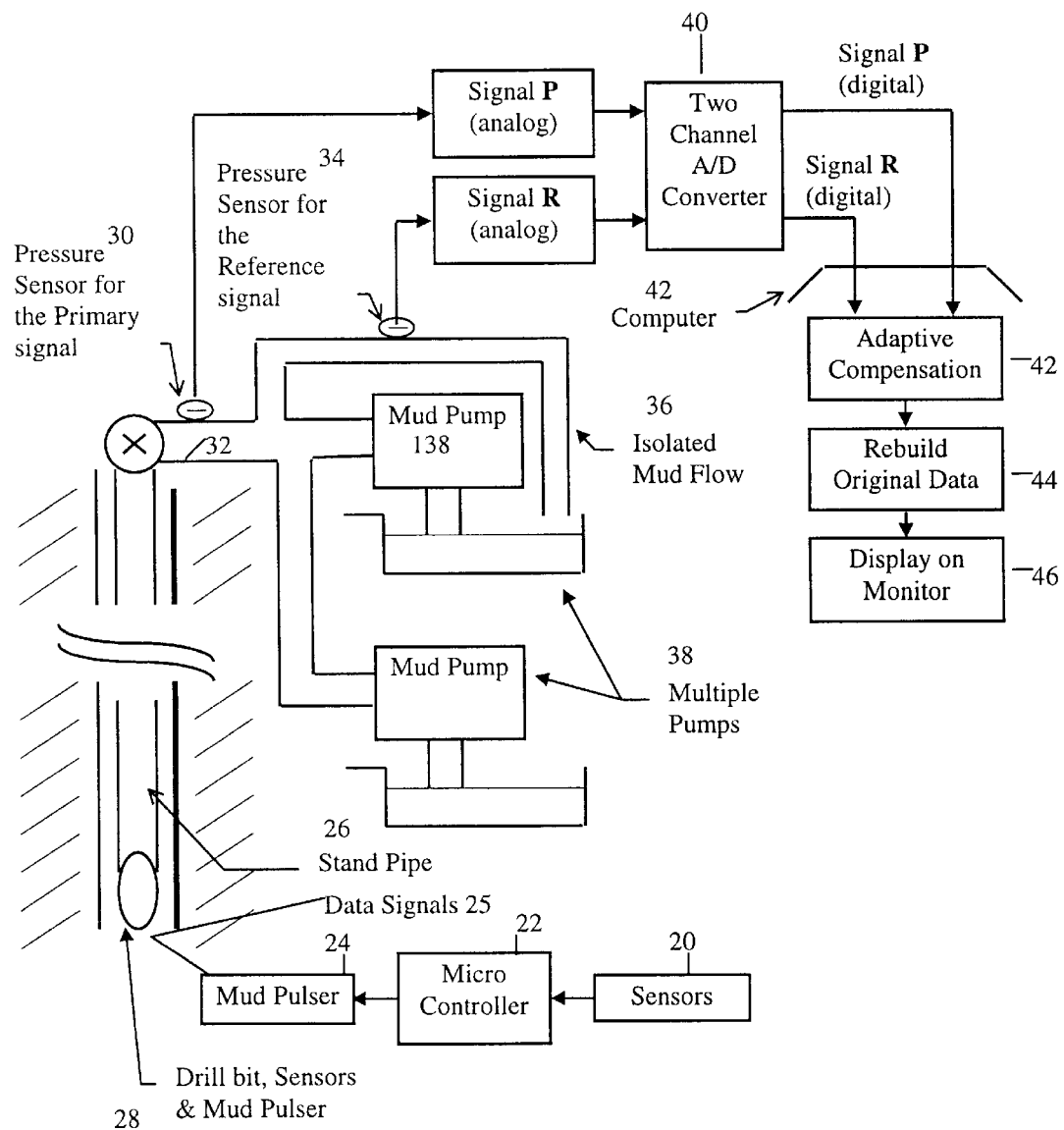
FIG. 8. is a block diagram of the MWD system using a plurality of mud pumps.

FIG. 8 shows the present invention applied to a typical mud pump system incorporating a plurality of mud pumps. Obviously the invention could easily be applied to systems with only a single mud pump.

As shown in FIG. 8 sensors 20 sense the information to be transmitted and supply this information to a micro controller 22 that controls the mud pulser 24 to apply signals 25 to the mud in the stand pipe 26. In the illustrated arrangement further information from the drill bit is coded as illustrated at 28 and submitted to the mud pulsed 24 or a different mud pulser to form part of the signals 25.

A primary signal P is sensed by the pressure sensor positioned to sense pressure in the line 32 from the standpipe 26 and a reference signal R sensor 34 is provided to sense the pressure preferably in an isolated mud flow in a circulation line 36 on one of the plurality of mud pumps 38 in the system.

The signals P and R are converted from analog to digital as indicated at 40 and then in a computer 42 are subjected to the adaptive compensation technique of the present invention as indicated at 42 to rebuild the data as indicated at 44 and if desired display the data as indicated at 46.

Figure 9:
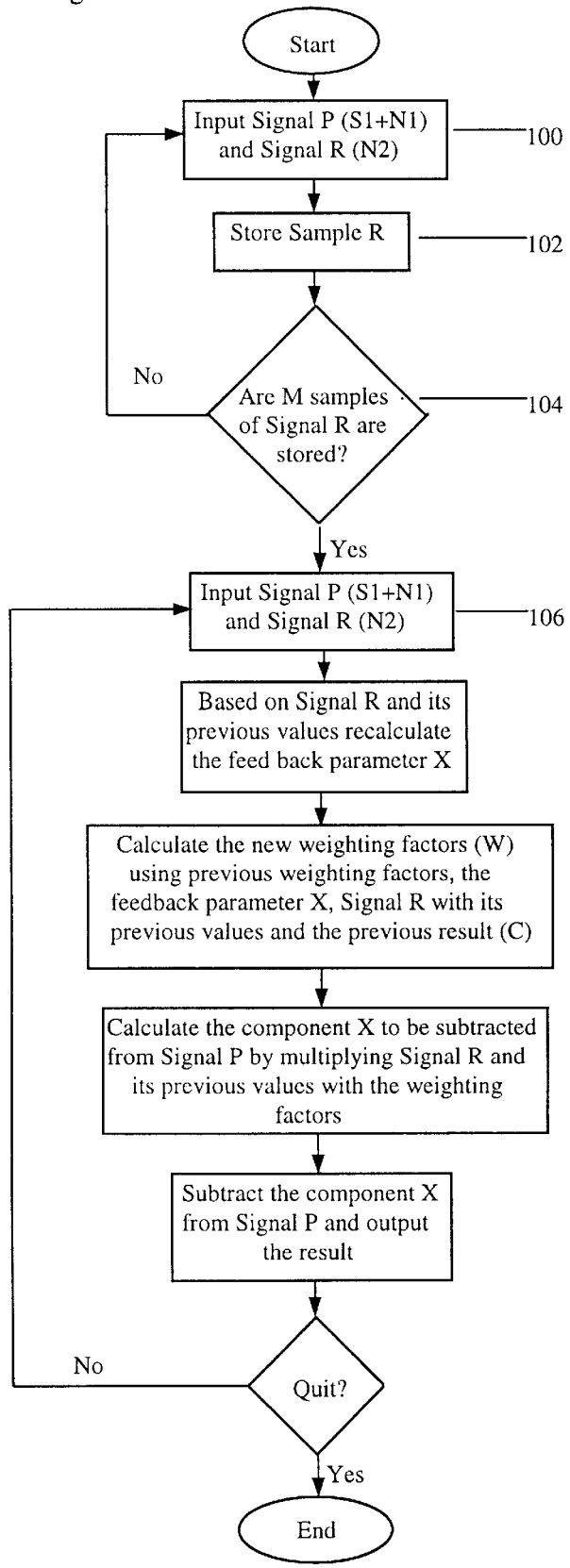
FIG. 9. is a block diagram for the software implementation of adaptive compensation specifically for a MWD system with only one mud pump.

A flow diagram for the adaptive system is shown in FIG. 9. As shown the signals P and R are input as indicated at 100 and sample R stored as indicated at 102 to accumulated the number of samples M (as indicated at 104) required for the iterative process of determining the weighting factors W. When sufficient of signals R are stored the signals P and R are then processed as indicated at 106 are subjected to processing steps 108 wherein the feedback parameter which is equivalent to component X of the primary signal, 110 which calculate new weighting factors W, 112 that recalculated component X, and 114 which subtracts X from the primary signal P to output at 114 the corrected output signal C.

Figure 10:
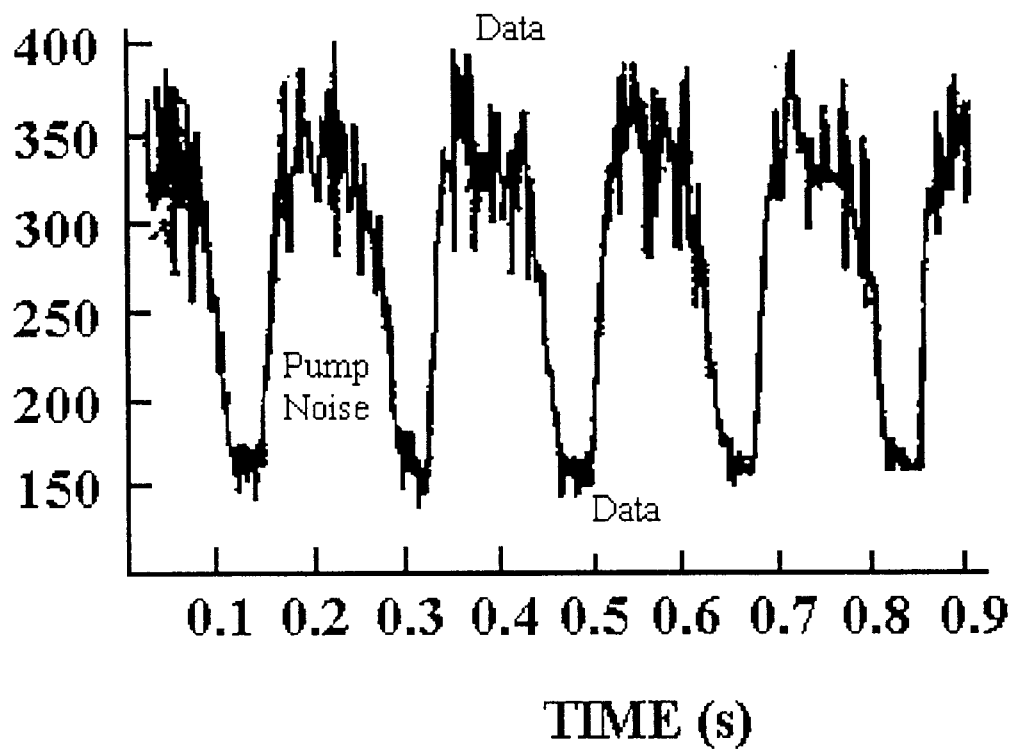
FIG. 10 is a plot of mud pump noise combined with information signals from downhole.

A typical example of a primary signal measured and having data at the highest point on the signal is shown in FIG. 10.

The major problem faced by the MWD systems is the small signal-to-noise ratio of the signal measured at the surface, see Stone F. A., Grosso D., Wallace S., U.S. Pat. No. 5,272,680. issued Dec. 21, 1993. By the time the pressure pulses reach the surface they can be distorted, phase shifted and masked by background noise, a major component of which comes from the pressure waves created by the mud pump(s).

In an attempt to maximize the signal-to-noise ratio multiple filtering techniques have been developed to remove unwanted frequencies and noise see Gardner W. R., Merchant G. A., U.S. Pat. No. 5,490,121. Feb. 6, 1996. These techniques, while improving the signal-to-noise ratio, are limited in their capabilities. One such limiting factor is the variable width and the steep slopes of the information signals transmitted using the mud pulses. This implies that the frequency spectrum of the signals would be variable and wide.

What makes the process of adaptive compensation of mud pump noise of the present invention unique is the ability to continually adapt to the environment it inhabits. The compensator has two inputs, one is the primary signal P which is coming from the downhole sensor(s) which contains the primary sensor data S1 superimposed with noise N1, and the other is a noise signal N2 generated by the mud pump. The noise N1 in the primary input and the noise N2 in reference input or signal R are strongly correlated since the major source of disturbances in the system is the mud pump itself. It is assumed that the primary sensor signal S1 is not correlated with any of the noise signals N1 or N2. Extraction of the sensor data S1 from the primary signal is done by manipulating the signal N2 in real-time and subtracting it from the primary signal in such way that the energy of the resulting output signal C is minimized as above described.

By an iterative adjustment of the constants a, b and d in the algorithm of equation [20] above as above described an optimal effect can be achieved by suppressing different portions of the waveform resulting in the worsening of the signal-to-noise ratio in the reference channel.

Figure 11:
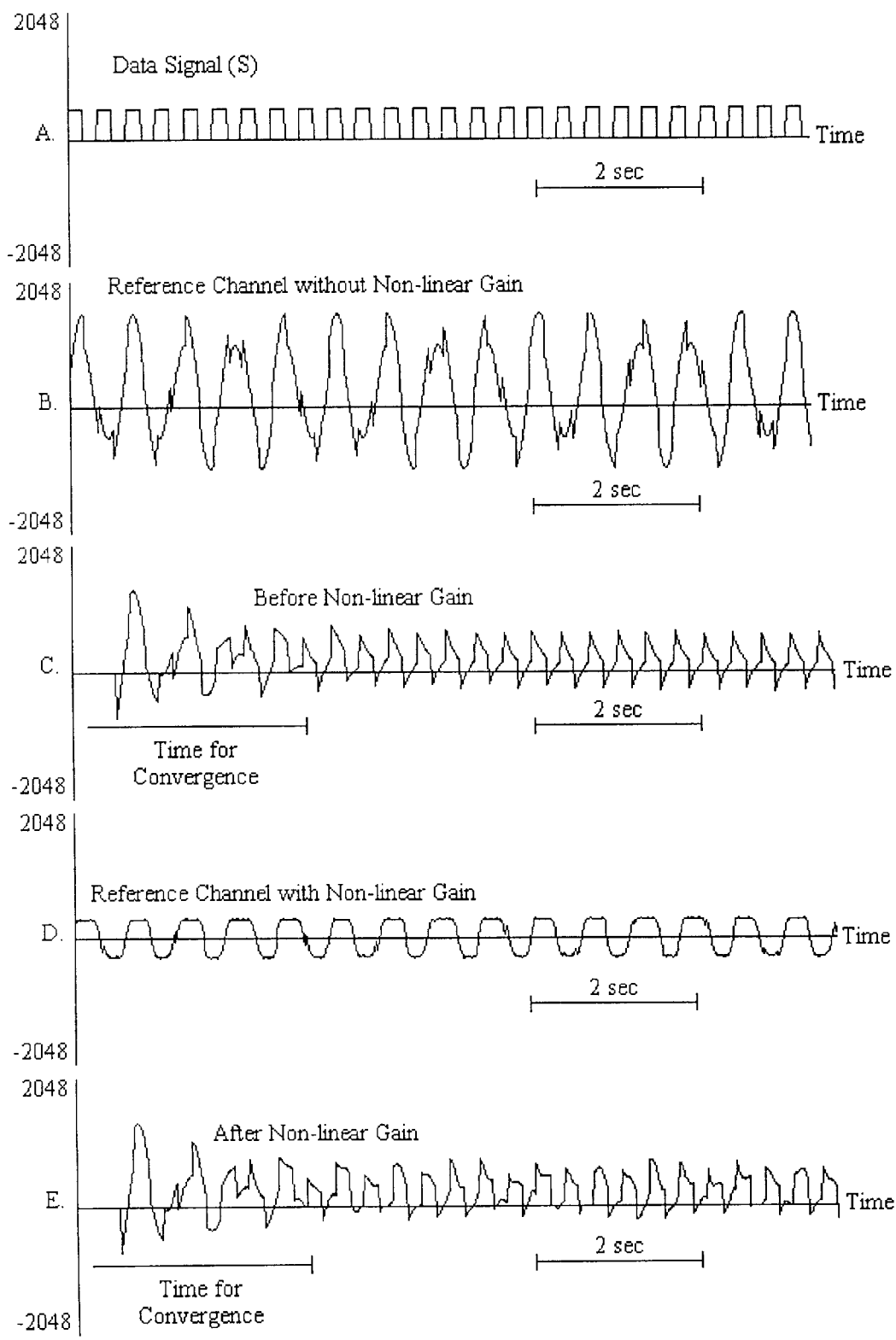

In the non-ideal noise situation of MWD adaptive compensation using pressure sensors for both channels, the variable information signal is superimposed on the pump noise in the reference channel with the information signal being most apparent at the top and bottom of this waveform. In areas of transition where the slope increases the data signal makes little impression on the reference signal. By choosing an appropriate non-linear function, higher amplitudes in the reference channel could be compressed so that the presence of the information signal is diminished, the signal-to-noise ratio is reduced and the reference signal better resembles the original sinusoidal waveform (FIG. 11). In the model example shown on FIG. 11 the parameters of the non-linear digital gain were chosen as a=120, b=−1 and d=580. The adjustment of the non-linear gain could start with a large d which would make the effect of the non-linear gain marginal. Iterative increments of a follow, combined with subsequent quantitative evaluations of the output of the adaptive compensator as compared to a model signal. In these calculations a rectangular primary signal and sinusoidal noise signal were used(see FIG. 11).

If the noise signal is complex, however, (varying plateaus at different levels) the non-linear gain will distort the noise signal thus making it difficult for the adaptive filter to eliminate the noise component in the primary signal. This could be the situation if the adaptive compensation is to be applied in a non-ideal noise environment of a reference channel in which the phases of the pump noises coming from different mud pumps are not necessarily the same and the resulting noise signal is polyharmonic.

It is apparent from the above that real-time adaptive compensation can be successfully applied in MWD. Non-linear digital gain in the reference channel can improve significantly the performance of adaptive compensation systems in non-ideal noise environments.

Having described the invention, modifications will be evident to those skilled in the art without departing from the scope of the invention as defined in the appended claims.

What is claimed is:

1. A method of applying adaptive filtering in non-ideal noise environments comprising sending an output signal C, collecting a primary signal P containing an information signal component S1 representing said output signal C and a first noise signal N1, collecting a reference signal R containing a second noise signal N2 and a second information signal S2 representative of said output signal C in said reference signal R, generating a compensation signal X based on said reference signal R, said output signal C and weighting factors W, said compensation signal X being derived using a first equation $$X = N3 + S3$$

where;

N3=a manipulated input derived from the error component N2 in reference signal R, and S3 is a manipulated input derived from the information component S2 of the reference signal R and subtracting X from said primary signal P to generate a corrected said output signal C based on a second equation $$C = S1 + N1 - X$$

taking a third equation C=(S1−S3)+(N1−N3) derived from said second equation and squaring to provide a fourth equation $$C^2 = (S1-S3)^2 + 2(S1-S3)(N1-N3) + (N1-N3)^2$$

taking the expectation of said fourth equation to obtain a fifth equation $E[C^2]=E[(S1+S2)^2]+2E[(S1-S3)(N1-N3)]+E[(N1-N3)^2]$ and noting that $E[(S1-S3)(N1-N3)]=0$ a sixth equation $E[C^2]=E[(S1+S2)^2]+E[(N1-N3)^2]$ is obtained, said sixth equation is minimized for adaptive compensation to provide a seventh equation $$\min E[C^2] = \min E[(S1-S3)^2] + \min E[(N1-N3)^2]$$

manipulating the values of $$N3+S3=(N2+S2)\cdot e^{(a+b|N2+S2|/d)}$$

selecting values for a, b and d by computer modeling for information and noise signal components S1 and N1 of said primary signal P and S2 and N2 in said reference signal R while controlling iterative adjustments using quantitative analysis of cross correlation coefficients between corresponding intervals of said output signal in an ideal noise environment and said output signal in the non-ideal noise environment after convergence time had lapsed.

2. A method of applying adaptive filtering in non-ideal noise environments as defined in claim 1 wherein said modeling comprises a selecting a first signal of a first form mixed with a second signal of a second form, selecting values for d and b and iteratively deriving a value for a.

3. A method of applying adaptive filtering in non-ideal noise environments as defined in claim 2 wherein d has value of between 250 and 1500 and b is −1 or +1.

4. A method of applying adaptive filtering in non-ideal noise environments as defined in claim 3 wherein said primary signal and reference signal are from measurements by sensors at different locations in a mud pumping system of a measurement while drilling signal operation.

5. A method of applying adaptive filtering in non-ideal noise environments as defined in claim 3 wherein said primary and reference signals are measurement in a biomedical information system.

6. A method of applying adaptive filtering in non-ideal noise environments as defined in claim 2 wherein d has value of between 250 and 500 and b is −1 or +1.

7. A method of applying adaptive filtering in non-ideal noise environments as defined in claim 6 wherein said primary signal and reference signal are from measurements by sensors at different locations in a mud pumping system of a measurement while drilling signal operation.

8. A method of applying adaptive filtering in non-ideal noise environments as defined in claim 6 wherein said primary and reference signals are measurement in a biomedical information system.

9. A method of applying adaptive filtering in non-ideal noise environments as defined in claim 2 wherein said primary signal and reference signal are from measurements by sensors at different locations in a mud pumping system of a measurement while drilling signal operation.

10. A method of applying adaptive filtering in non-ideal noise environments as defined in claim 2 wherein said primary and reference signals are measurement in a biomedical information system.

11. A method of applying adaptive filtering in non-ideal noise environments as defined in claim 1 wherein said primary signal and reference signal are from measurements by sensors at different locations in a mud pumping system of a measurement while drilling signal operation.

12. A method of applying adaptive filtering in non-ideal noise environments as defined in claim 1 wherein said primary and reference signals are measurement in a biomedical information system.

* * * * *